(12) United States Patent
Blayvas

(10) Patent No.: US 8,063,352 B2
(45) Date of Patent: Nov. 22, 2011

(54) COLOR SEPARATION FILTER FOR SOLID STATE SENSOR

(75) Inventor: Vladislav Blayvas, Jerusalem (IL)

(73) Assignee: Eastman Kodak Company, Rochester, NY (US)

( * ) Notice: Subject to any disclaimer, the term of this patent is extended or adjusted under 35 U.S.C. 154(b) by 236 days.

(21) Appl. No.: 12/490,415

(22) Filed: Jun. 24, 2009

(65) Prior Publication Data

US 2010/0327151 A1    Dec. 30, 2010

(51) Int. Cl.
*H01L 27/00* (2006.01)

(52) U.S. Cl. .............. 250/208.1; 250/226; 250/216; 348/273; 348/337

(58) Field of Classification Search ........... 250/208.1, 250/214.1, 226, 216; 257/294, 432, 435; 348/272, 273, 276, 277, 336, 337, 338
See application file for complete search history.

(56) References Cited

U.S. PATENT DOCUMENTS

| | | | |
|---|---|---|---|
| 3,971,065 A | 7/1976 | Bayer | |
| 7,138,663 B2 | 11/2006 | Hoshuyama | |
| 7,508,431 B2 * | 3/2009 | Sato et al. | 348/294 |
| 7,667,785 B2 * | 2/2010 | Van Gorkom et al. | 349/57 |

* cited by examiner

*Primary Examiner* — Kevin Pyo
(74) *Attorney, Agent, or Firm* — Nelson Adrian Blish

(57) ABSTRACT

A color separation filter (100), for a solid state image sensor includes a micro lens array (108) adapted to collect a full color spectrum light source (104), a mask layer (120) is attached to the micro lens array (108), the mask layer (120) includes plurality of openings (124), each opening is positioned in front of a single micro lens from the micro lens array. Additionally it includes a first array of prisms (204), each prism is positioned in front of each of the openings, a second array of prisms (212) is attached to the first array of prisms with an optical glue layer (208). Each prism from the first array of prisms is positioned in front of a prism from the second array of prisms to create a symmetrical optical path for the color spectrum light source (304).

10 Claims, 3 Drawing Sheets

COLOR SEPARATION FILTER FOR SOLID STATE SENSOR

FIELD OF THE INVENTION

This present invention relates to solid state image sensors and more specifically to a color separation filter configured to separate full image spectral light into primary color components.

BACKGROUND OF THE INVENTION

In a color imaging device such as a color digital camera, a color separation unit for separating light from a light source into primary colors is required. Color separation units which are based on the well known Bayer filter (described in commonly-assigned U.S. Pat. No. 3,971,065) are widely used in the industry. The Bayer color filter array suggests arranging R, G, B color filters on a square grid of photo sensors. This particular arrangement of color filters is used in most single-chip digital image sensors in digital cameras, camcorders, and scanners to create a color image. The Bayer arrangement of color filters on an image sensor array is two-by-two cell contains two green, one blue, and one red filter. This filter is often called RGBG filter, representing the color components included in each cell. There are twice as many green filters as red or blue ones, exploiting the human eye's higher sensitivity to green light.

The raw output data acquired by a Bayer filter is often called a Bayer pattern image. Since each pixel is filtered to record only one of three colors, the data from each pixel cannot filly determine color on its own, all four RGBG elements must be considered. To obtain a full-color image, various algorithms are employed, often called dernosaic algorithms. Those algorithms are used to interpolate a set of complete red, green, and blue values for each pixel, they require various amounts of computing power resulting in varying-quality final images. This can be done in-camera or in an attached computer, producing a JPEG, TIFF image format or raw data directly acquired from the sensor.

When imaging an object on a Bayer array configuration, proximal segments of the image are sensed by different sensors. The color separation per pixel, therefore, is not completely accurate and segmented. When presenting the sensed image, one usually relies on the averaging nature of the human visual perception.

U.S. Pat. No. 7,138,663 places a micro lens over a triplet of photoreceptors. Specific wavelengths of light are separated and passed to specific photoreceptors designated to record red, green, and blue wavelengths. Light separation is achieved with set dichroic mirrors. This system emulates three CCD imaging systems by using a single array. Image quality is theoretically improved due to the usage of much smaller gaps between photoreceptors assigned to a specific wavelength. Micro lenses are also used in order to collect all pertinent wavelengths components and reduce possible light loss.

SUMMARY OF THE INVENTION

Briefly, according to one aspect of the present invention, a color separation filter for solid state image sensor includes a micro lens array adapted to collect fill color spectrum light, and a mask layer attached to the micro lens array. The mask layer has a plurality of openings and each opening is positioned in front of a single micro lens from the micro lens array. A first array of prisms has a prism positioned in front of each of the openings, and a second array of prisms is attached to the first array of prisms with an optical glue layer. Each prism from the first array of prisms is positioned in front of a prism from the second array of prisms to create a symmetrical optical path for the color spectrum light source. An array of photo detectors is arranged in a plurality of photo detector groups and each of the groups is coupled to a prism from the second array of prisms. Each photo detector from each photo detector group is configured to receive a portion of the full color spectrum light source propagating via the symmetrical optical path.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

The apparatus particularly points out and distinctly claims the concluding portion of the specification. The apparatus, however, both as to organization and method of operation, may best be understood by reference to the following detailed description when read with the accompanied drawings, in which like reference characters refer to the same parts throughout the different views. The drawings are not necessarily to scale, emphasis instead being placed upon illustrating the principles of the method.

DETAILED DESCRIPTION OF THE INVENTION

In the following detailed description, reference is made to the accompanying drawings which form a part hereof, and in which is shown by way of illustration specific embodiments in which the method and apparatus may be practiced. Because components of embodiments of the present apparatus can be positioned in a number of different orientations, the directional terminology is used for purposes of illustration and is in no way limiting.

Figure 1:
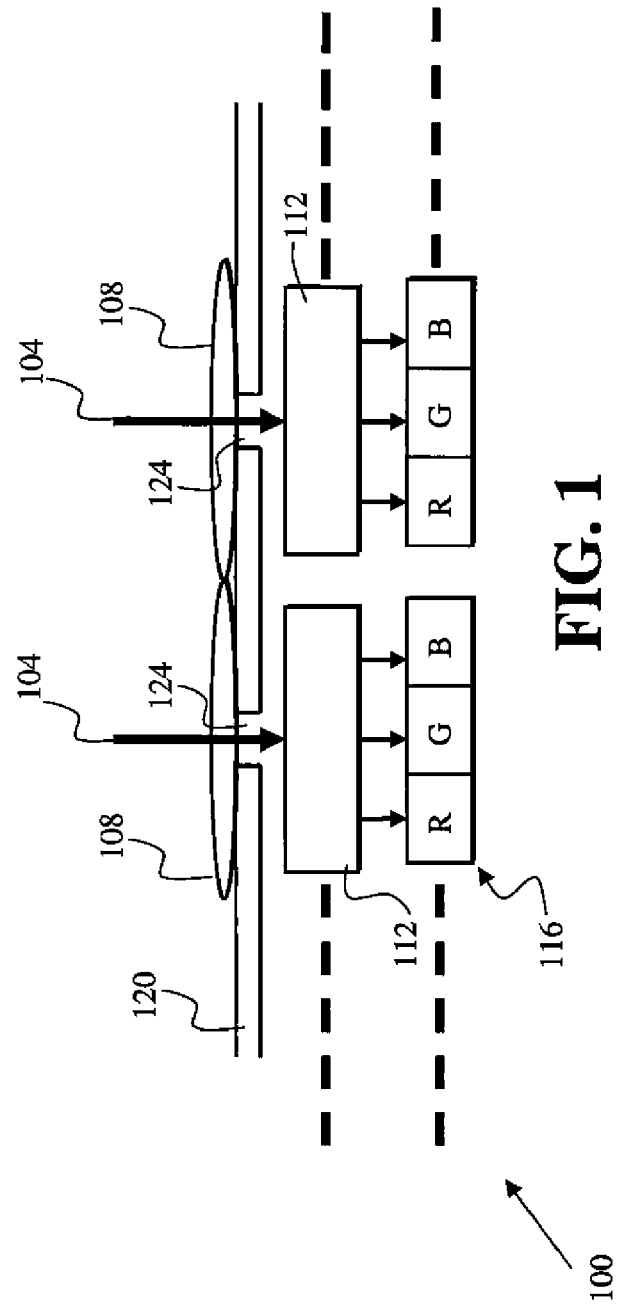
FIG. 1 is a schematic illustration a color filter element.

The invention proposes a color separation filter which operates on a pixel level. FIG. 1 depicts a sectional view of the proposed color filter element 100. Color filter element 100 includes an RGB dispersion filter 112 configured to separate incident light 104 into chromatic separated components such as red, green, and blue (RGB).

The light beams 104 from the imaged object are collected by the corresponding pixel micro lens 108. The light beams 104 are directed into openings 124 on mask layer 120, and further separated into chromatic components by an optical dispersion filter 112. The intensity of each of the separated chromatic components is sensed by a dedicated sensor within the pixel sensor matrix 116.

Figure 2:
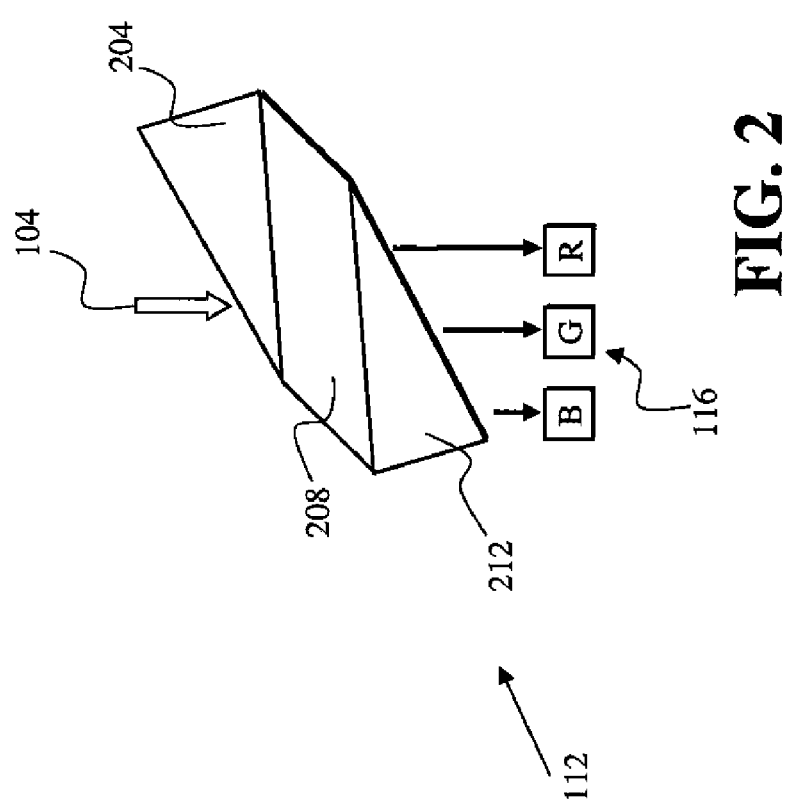
FIG. 2 is a schematic illustration of a dual prism configuration adapted to chromatically separate incident light.

The optical dispersion filter 112 is shown in more detail in FIG. 2. The dispersion filter includes a first layer of micro prisms 204 typically made of transparent material such as glass with wavelength sensitive refractive coefficient N1; namely a dispersion coefficient different from zero. Prism 204 disperses the incident light beam 104 according to the wavelength. As the dispersion coefficient is larger, the chromatic separation is more significant. An additional stage of dispersion is achieved by repeating the process with a second layer of micro prisms 212 with refractive coefficient N2. Since the dispersion occurs at each interface of the prism 204, it is further increased if the difference between the coefficients of refractions N1 and N2 at the interface is large. Thus, it is desired to use a material with high N value for the prisms, and low N values (as close to 1 as possible) for the interfacing materials such as the glue layer 208.

Figure 3:
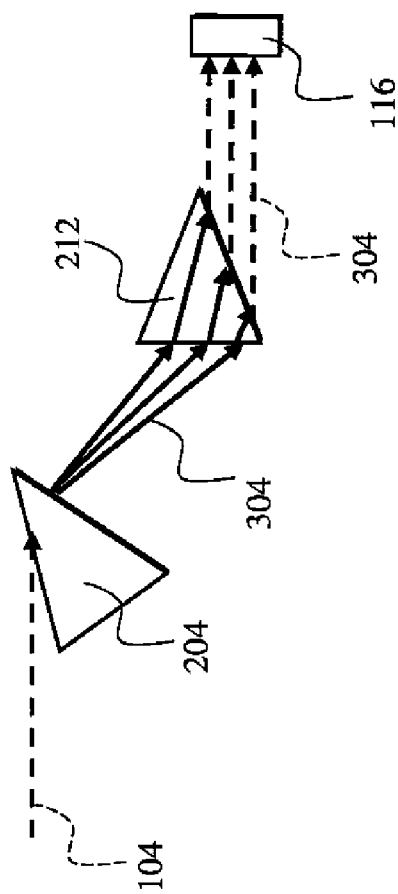
FIG. 3 is a schematic illustration of the optical path created by the dual prism configuration.

FIG. 3 illustrates a schematic optical path of the incident light 104 when entered into optical dispersion filter 112. Specifically FIG. 3 shows the chromatic separation into the different chromatic components 304 and presents a two stage dispersing process described above. Incident light 104 contains the fill light spectrum before impinging on micro prisms 204. Light 104 is dispersed by prisms 204 to form chromatically dispersed components 304. The dispersed components 304 further impinges on micro prisms 212. Each of the 304 components within the is further dispersed by micro prisms 212 and tunneled in a timely manner to be detected by pixel sensor matrix 116. The intensity of various chromatic components is measured by specific sensors within a pixel sensor matrix 116.

The invention has been described in detail with particular reference to certain preferred embodiments thereof, but it will be understood that variations and modifications can be effected within the scope of the invention.

PARTS LIST 100 solid image sensor color filtering element
104 incident light
108 array of micro lenses
112 RGB dispersion filter
116 pixel sensor matrix
120 mask layer
124 openings
204 first layer of micro prisms
208 optical glue layer
212 second layer of micro prisms
304 dispersed chromatically separated components

The invention claimed is:

1. A color separation filter for solid state image sensor comprising:
    a micro lens array adapted to collect light from a full color spectrum light source;
    a mask layer attached to said micro lens array wherein said mask layer comprises plurality of openings, each opening positioned in front of a single micro lens from said micro lens array;
    a first array of prisms wherein each prism from said array of prisms is positioned in front of each of said plurality of openings;
    a second array of prisms attached to said first array of prisms with an optical glue layer wherein each prism from said first array of prisms is positioned in front of a prism from said second array of prisms creating a symmetrical optical path for said color spectrum light source;
    an array of photo detectors arranged in a plurality of photo detector groups wherein each of said groups is coupled to a prism from said second array of prisms; and
    each photo detector in said plurality of photo detector groups is configured to receive a portion of said full color spectrum light propagating via said symmetrical optical path.

2. The color separation filter according to claim 1 wherein a width of each of said mask layer openings is less than three micro meter.

3. The color separation filter according to claim 1 wherein said optical glue layer is characterized by refractive index close to 1.

4. The color separation filter according to claim 1 wherein each of said photo detectors groups comprises at least one or more photo detector channels.

5. The color filter according to claim 4 wherein said photo detector channels comprise red, green, blue components or a combination thereof.

6. A color separation filter for solid state image sensor comprising:
    a micro lens array which receives full spectrum light through a first surface;
    a mask layer wherein a first surface of said mask layer is attached to a second surface of said micro lens array;
    a plurality of openings in said mask layer wherein each of said openings positioned in front of each micro lens from said micro lens array;
    a first array of prisms located on a second surface of said mask layer wherein a first surface of each prism from said array of prisms is positioned in front of each of said plurality of openings;
    a second array of prisms attached wherein a first surface of each prism from said second array of prisms is positioned in front of a second surface of each prism from said first array of prisms creating an optical path for said light;
    an array of photo detectors arranged in a plurality of photo detector groups wherein each of said groups is coupled to a second surface of each prism of said second array of prisms; and
    wherein each photo detector in said plurality of photo detector groups receives a portion of said full color spectrum light via said optical path.

7. The color separation filter according to claim 6 wherein a width of each of said mask layer openings is less than three micro meter.

8. The color separation filter according to claim 6 wherein said first and second prisms are attached by an optical glue layer.

9. The color separation filter according to claim 6 wherein each of said photo detectors groups comprises at least one or more photo detector channels.

10. The color filter according to claim 9 wherein said photo detector channels comprise red, green, blue components or a combination thereof.

* * * * *